US011958486B2

(12) United States Patent
Dulac et al.

(10) Patent No.: US 11,958,486 B2
(45) Date of Patent: *Apr. 16, 2024

(54) METHOD FOR ACCELERATING A VEHICLE FROM REST

(71) Applicant: BOMBARDIER RECREATIONAL PRODUCTS INC., Valcourt (CA)

(72) Inventors: Maxime Dulac, St-Denis-de-Brompton (CA); Donavan Asselin, Valcourt (CA); Francois St-Laurent, Sherbrooke (CA); Edouard Levesque, Shefford (CA); Frederic Rancourt, Frintenac (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,538

(22) Filed: Mar. 1, 2023

(65) Prior Publication Data

US 2023/0202480 A1 Jun. 29, 2023

Related U.S. Application Data

(63) Continuation of application No. 17/575,773, filed on Jan. 14, 2022, now Pat. No. 11,608,064.
(Continued)

(51) Int. Cl.
*F02D 41/10* (2006.01)
*B60K 26/02* (2006.01)
(Continued)

(52) U.S. Cl.
CPC ....... *B60W 30/18027* (2013.01); *B60K 26/02* (2013.01); *B60W 30/182* (2013.01);
(Continued)

(58) Field of Classification Search
CPC ......... B60W 30/18027; B60W 30/182; B60W 2300/362; B60W 2300/43;
(Continued)

(56) References Cited

U.S. PATENT DOCUMENTS 10,865,700 B2   12/2020  Lefebvre et al.
11,608,064 B2 *  3/2023  Dulac ................. F02D 41/0007
(Continued)

OTHER PUBLICATIONS

Precision EFI, Precision EFI is proud to release the first launch control for Ski-doo 900 ACE Turbo , using the OEM ecu & OEM controllers. Retrieved from https://www.facebook.com/precisionefi/videos/793669428092704/ on Mar. 25, 2022.

*Primary Examiner* — Hai H Huynh
(74) *Attorney, Agent, or Firm* — BCF LLP

(57) ABSTRACT

A method for accelerating a vehicle from rest, including controlling an engine according to a first control strategy; receiving a mode indication selecting a launch control mode for accelerating; controlling the engine according to a second control strategy; in response to greater than zero accelerator position, controlling to increase throttle valve opening and engine control operational conditions to limit engine torque output; while in the second control strategy, receiving an indication to end control by the second control strategy; and in response to indication, controlling according to the first control strategy causing the vehicle to accelerate from rest, the first acceleration rate greater than the second rate corresponding to accelerating from rest after sequentially controlling according to the first and second control strategies; the second acceleration rate corresponding to accelerating from rest by controlling according to the first control strategy without previously controlling according to the second control strategy.

20 Claims, 10 Drawing Sheets

Related U.S. Application Data

(60) Provisional application No. 63/143,095, filed on Jan. 29, 2021.

(51) Int. Cl.
   *B60W 30/18* (2012.01)
   *B60W 30/182* (2020.01)
   *B62M 27/02* (2006.01)
   *F02D 41/00* (2006.01)

(52) U.S. Cl.
   CPC ......... *B62M 27/02* (2013.01); *F02D 41/0007* (2013.01); *F02D 41/10* (2013.01); *B60W 2300/362* (2013.01); *B60W 2300/43* (2013.01); *B60W 2510/18* (2013.01); *B60W 2540/10* (2013.01); *B60W 2710/0605* (2013.01); *B60W 2710/0644* (2013.01); *B60W 2710/0666* (2013.01); *B62M 2027/025* (2013.01); *B62M 2027/027* (2013.01); *F02D 2200/50* (2013.01); *F02D 2200/602* (2013.01)

(58) Field of Classification Search
   CPC ......... B60W 2510/18; B60W 2540/10; B60W 2710/0605; B60W 2710/0644; B60W 2710/0666; B60K 26/02; B60K 2026/028; B62M 27/02; B62M 2027/025; B62M 2027/027; F02D 41/0007; F02D 41/10; F02D 41/045; F02D 41/22; F02D 2200/50; F02D 2200/602; F02D 2200/021; F02D 2200/0414; F02D 2200/101; F02D 2250/26; F02P 5/045; F02P 5/1504; B60Y 2200/124; B60Y 2200/252; Y02T 10/12; B62K 23/02; B62L 3/00
   USPC ....... 123/299, 300, 399, 491, 492, 493, 436, 123/675, 559.1, 406.25, 406.36, 406.5, 123/406.51, 406.52; 701/103–105, 701/110–113

See application file for complete search history.

(56) References Cited

U.S. PATENT DOCUMENTS

| | | | |
|---|---|---|---|
| 11,639,684 B2* | 5/2023 | Buchwitz | F02D 41/08 123/339.23 |
| 11,725,573 B2* | 8/2023 | Bryant | F02B 37/183 60/602 |
| 11,725,599 B2* | 8/2023 | Buchwitz | F02D 23/00 60/605.1 |
| 2021/0054778 A1 | 2/2021 | Lefebvre et al. | |
| 2021/0078674 A1 | 3/2021 | Schuehmacher et al. | |

* cited by examiner

METHOD FOR ACCELERATING A VEHICLE FROM REST

CROSS-REFERENCE

The present application is a continuation of U.S. patent application Ser. No. 17/575,773, entitled "Method for Accelerating a Vehicle from Rest," filed Jan. 14, 2022, which claims priority to U.S. Provisional Patent Application No. 63/143,095, entitled "Method for Accelerating a Vehicle from Rest," filed Jan. 29, 2021, the entirety of both of which is incorporated herein by reference.

FIELD OF THE TECHNOLOGY

The present technology relates to controlling an engine of a vehicle, and more specifically to methods for accelerating a vehicle from rest.

BACKGROUND

For vehicles having turbo-charged internal combustion engines, such as those used in snowmobiles and all-terrain vehicles (ATVs), the efficiency of the combustion process can be increased by compressing the air entering the engine. This can be accomplished using a turbocharger connected to the air intake and exhaust systems of the snowmobiles. The compression of the air by the turbocharger may be of particular importance when the internal combustion engine is operated in environments where atmospheric pressure is low or when the air gets thinner, such as when the engine is operated at high altitudes.

When accelerating the vehicle from rest, however, there is a delay in the efficiency boost from the turbocharger due to the time it takes for the turbocharger to run at full capacity (referred to as "spooling-up"). The spooling-up process may even, in some cases, decrease air flow to the engine, slowing the initial acceleration (referred to as "turbo-lag"). In some cases, the turbocharger could be bypassed during initial acceleration in order to avoid turbo-lag, but in such cases any benefit of the turbocharger would be delayed until the turbocharger was eventually spooled-up.

There is thus a need for methods or systems for accelerating from rest for turbo-charged engines that could allow for benefitting from turbocharger boost while overcoming some of the previously known disadvantages of utilizing the turbocharger during initial acceleration.

SUMMARY

It is an object of the present technology to ameliorate at least some of the inconveniences present in the prior art.

According to one aspect of the present technology, there is provided methods and systems for accelerating a turbo-charged vehicle from rest. Specifically, the present embodiment is described in reference to a snowmobile and an ATV. The method includes, upon selection of a "launch control" mode to aid in initial acceleration, increasing engine speed and opening a throttle valve while the vehicle is still at rest. By opening the throttle and increasing the engine speed (revving up the engine), air flow through the engine and also the turbocharger is increased. As such, the turbocharger can spool-up prior to initial acceleration (acceleration from rest) of the vehicle. This allows for faster acceleration from rest, as boost from the turbocharger is available for all of the initial acceleration, with generally no time lost to spooling up and generally without loss of acceleration power from lagging in the turbocharger. In order to avoid the vehicle from prematurely accelerating when the throttle is open, by engaging a transmission and/or overwhelming the brakes for example, engine speed and torque are limited while the engine is idling at increased engine speed and the throttle is open. Engine speed and torque limiting are achieved by causing inefficient ignition which is produced by adjusting the ignition angle to delay combustion ignition in one or more cylinders. Engine speed and torque limiting can additionally or alternatively be achieved by deactivating one or more cylinders by preventing ignition and fuel injection periodically in a given cylinder.

According to an aspect of the present technology, there is provided a method for accelerating a vehicle from rest. The method includes controlling, by a controller, an engine of the vehicle according to a first control strategy; receiving, by the controller, a mode indication indicating that an operator of the vehicle has selected a launch control mode for accelerating the vehicle; receiving, by the controller, a brake-on indication indicating that a braking system of the vehicle has been activated; in response to receiving at least the mode indication and the brake-on indication, controlling the engine, by the controller, according to a second control strategy; while controlling the engine according to the second control strategy, determining, by the controller, an accelerator position of an accelerator of the vehicle; in response to the accelerator position being greater than zero, controlling, by the controller, the engine to: increase, according to the accelerator position, an opening of a throttle valve of the engine, and control operational conditions of the engine to limit engine torque output; while controlling the engine according to the second control strategy, receiving, by the controller, a brake-off indication indicating that the braking system has been released; and in response to receiving the brake-off indication, controlling the engine, by the controller, according to the first control strategy, controlling the engine according to the first control strategy with the braking system having been released causing the vehicle to accelerate from rest, a first rate of acceleration from rest of the vehicle being greater than a second rate of acceleration from rest of the vehicle for corresponding changes in accelerator position, the first rate of acceleration corresponding to the vehicle accelerating from rest after sequentially controlling the engine according to the first and second control strategies; the second rate of acceleration corresponding to the vehicle accelerating from rest by controlling the engine according to the first control strategy without previously controlling the engine according to the second control strategy.

In some embodiments, controlling the engine according to the second control strategy includes: increasing a speed of the engine, and limiting a torque output of the engine.

In some embodiments, controlling the engine according to the first control strategy comprises controlling a turbocharged engine of the vehicle according to standard operational parameters.

In some embodiments, the method of further includes determining, by the controller, that a speed of the engine has surpassed a threshold engine speed; and wherein the controller controls the engine according to the second control strategy in response to receiving the mode indication and the brake-on indication, and determining that the engine speed has surpassed a threshold engine speed.

In some embodiments, the method further includes prior to receiving the mode indication, determining, by the controller, that each of a plurality of initial mode conditions have been met; and in response to the plurality of initial mode conditions being met, enabling a mode input by the controller, the mode indication being sent to the controller from the mode input upon selection of the launch control mode by the operator via the mode input.

In some embodiments, the method further includes while controlling the engine according to the second control strategy: determining, by the controller, that at least one deactivation condition has been met; and in response to the at least one deactivation condition being met, returning to a standard operation mode whereby the vehicle is operated according to the first control strategy.

In some embodiments, determining that the at least one deactivation condition has been met includes determining that a time limit of controlling the engine according to the second control strategy has been reached.

In some embodiments, the method further includes subsequent to receiving the mode indication and prior to receiving the brake-off indication: determining, by the controller, that at least one deactivation condition has been met; and in response to the at least one deactivation condition being met, returning to a standard operation mode whereby the vehicle is operated according to the first control strategy.

In some embodiments, controlling operational conditions of the engine to limit engine torque output comprises at least one of: delaying combustion ignition; and deactivating at least one cylinder.

In some embodiments, in response to increasing the opening of the throttle valve according to the accelerator position, air flow increases through the engine.

In some embodiments, in response to controlling the engine according to the first and second control strategies, a speed of rotation of a turbocharger of the vehicle increases.

In some embodiments, a first speed of rotation of a turbocharger of the vehicle upon acceleration from rest is greater than a second speed of rotation of the turbocharger upon acceleration from rest; the first speed of rotation corresponds to the vehicle accelerating from rest after sequentially controlling the engine according to the first and second control strategies; and the second speed of rotation corresponds to the vehicle accelerating from rest by controlling the engine according to the first control strategy without previously controlling the engine according to the second control strategy.

In some embodiments, in response to receiving the mode indication and prior to controlling the engine according to the second strategy, controlling the engine to increase engine speed.

In some embodiments, the method further includes subsequent to receiving the mode indication and prior to controlling the engine according to the first strategy: determining, by the controller, that at least one deactivation condition has been met; and in response to the at least one deactivation condition being met, returning to a standard operation mode whereby the vehicle is operated according to the first control strategy.

In some embodiments, determining that the at least one deactivation condition has been met includes determining that a time limit of increased engine speed has been reached.

According to another aspect of the present technology, there is provided a vehicle including a frame; at least seat connected to the frame; an engine supported by the frame; a turbocharger operatively connected to the engine; a controller communicatively connected to the engine; and an accelerator communicatively connected to the controller, the controller being configured to perform the method of any of the above embodiments.

According to yet another aspect of the present technology, there is provided a vehicle including a frame; at least two ground engaging members connected to the frame; a braking system operatively connected to at least one of the at least two ground engaging members; at least seat connected to the frame; an engine supported by the frame; a turbocharger operatively connected to the engine; a controller communicatively connected to the engine; and an accelerator communicatively connected to the controller, the controller being configured to perform the steps of: controlling, by a controller, an engine of the vehicle according to a first control strategy; receiving, by the controller, a mode indication indicating that an operator of the vehicle has selected a launch control mode for accelerating the vehicle; receiving, by the controller, a brake-on indication indicating that a braking system of the vehicle has been activated; in response to receiving the mode indication and the brake-on indication, controlling the engine, by the controller, according to a second control strategy; while controlling the engine according to the second control strategy, determining, by the controller, an accelerator position of an accelerator of the vehicle; in response to the accelerator position being greater than zero, controlling, by the controller, the engine to: increase, according to the accelerator position, an opening of a throttle valve of the engine, and control operational conditions of the engine to limit engine torque output; while controlling the engine according to the second control strategy, receiving, by the controller, a brake-off indication indicating that the braking system has been released; and in response to receiving the brake-off indication, controlling the engine, by the controller, according to the first control strategy, controlling the engine according to the first control strategy with the braking system having been released causing the vehicle to accelerate from rest, a first rate of acceleration from rest of the vehicle being greater than a second rate of acceleration from rest of the vehicle for corresponding changes in accelerator position, the first rate of acceleration corresponding to the vehicle accelerating from rest after sequentially controlling the engine according to the first and second control strategies; the second rate of acceleration corresponding to the vehicle accelerating from rest by controlling the engine according to the first control strategy without previously controlling the engine according to the second control strategy.

In some embodiments, the vehicle further includes a mode input communicatively connected to the controller; and wherein the controller is further configured to perform the steps of: prior to receiving the mode indication, determining, by the controller, that each of a plurality of initial mode conditions have been met, and in response to the plurality of initial mode conditions being met, enabling the mode input by the controller to allow the operator to select the launch control mode.

In some embodiments, the vehicle is a snowmobile; the at least two ground engaging elements include: two skis connected to the frame, and an endless track disposed rearward of the two skis; the at least one seat is at least one straddle-seat; and the accelerator is an accelerator lever.

In some embodiments, the vehicle is an all-terrain vehicle (ATV); the at least two ground engaging elements include at least two wheels; the at least one seat is at least one straddle-seat; and the accelerator is an accelerator lever.

According to yet another aspect of the present technology, there is provided a method for accelerating a vehicle from rest. The method includes controlling, by a controller, an engine of the vehicle, the engine having a first mode and a second mode: the first mode controlling the engine speed from a first idle speed to a first maximum engine speed with respect to a corresponding idle accelerator position and a maximum accelerator position; the second mode controlling the engine speed from a second idle speed to a second maximum engine speed with respect to the corresponding idle acceleration position and the maximum acceleration position, the second maximum engine speed being less than the first maximum engine speed, receiving, by the controller, a mode indication indicating that an operator of the vehicle has selected a launch control mode for accelerating the vehicle; receiving, by the controller, a brake-on indication indicating that a braking system of the vehicle has been activated; in response to receiving the mode indication and the brake-on indication, controlling the engine, by the controller, according to the second mode; while controlling the engine according to the second mode, receiving, by the controller, a brake-off indication indicating that the braking system has been released; and in response to receiving the brake-off indication, controlling the engine, by the controller, according to the first mode, controlling the engine according to the first mode with the braking system having been released causing the vehicle to accelerate from rest.

According to yet another aspect of the present technology, there is provided a method for accelerating a vehicle from rest, the method including controlling, by a controller, an engine of the vehicle according to a first control strategy; receiving, from a mode input by the controller, a mode indication indicating that an operator of the vehicle has selected a launch control mode for accelerating the vehicle; in response to receiving at least the mode indication, controlling the engine, by the controller, according to a second control strategy; while controlling the engine according to the second control strategy, determining, by the controller, an accelerator position of an accelerator of the vehicle; in response to the accelerator position being greater than zero, controlling, by the controller, the engine to: increase, according to the accelerator position, an opening of a throttle valve of the engine, and control operational conditions of the engine to limit engine torque output; while controlling the engine according to the second control strategy, receiving, by the controller, an indication to end control by the second control strategy; and in response to receiving the indication, controlling the engine, by the controller, according to the first control strategy, controlling the engine according to the first control strategy in response to the indication causing the vehicle to accelerate from rest, a first rate of acceleration from rest of the vehicle being greater than a second rate of acceleration from rest of the vehicle for corresponding changes in accelerator position, the first rate of acceleration corresponding to the vehicle accelerating from rest after sequentially controlling the engine according to the first and second control strategies; the second rate of acceleration corresponding to the vehicle accelerating from rest by controlling the engine according to the first control strategy without previously controlling the engine according to the second control strategy.

In some embodiments, the method further includes prior to receiving the mode indication, determining, by the controller, that each of a plurality of initial mode conditions have been met; and in response to the plurality of initial mode conditions being met, enabling a mode input by the controller, the mode indication being sent to the controller from the mode input upon selection of the launch mode by the operator via the mode input.

In some embodiments, the method further includes while controlling the engine according to the second control strategy: determining, by the controller, that at least one deactivation condition has been met; and in response to the at least one deactivation condition being met, returning to a standard operation mode whereby the vehicle is operated according to the first control strategy.

In some embodiments, the indication to end control by the second control strategy includes a brake-off indication indicating that the braking system has been released.

In some embodiments, controlling operational conditions of the engine to limit engine torque output comprises at least one of delaying combustion ignition; and deactivating at least one cylinder.

In some embodiments, in response to increasing the opening of the throttle valve according to the accelerator position, air flow increases through the engine.

In some embodiments, in response to controlling the engine according to the first and second control strategies, a speed of rotation of a turbocharger of the vehicle increases.

In some embodiments, the method further includes subsequent to receiving the mode indication and prior to controlling the engine according to the first strategy subsequent to receiving the mode indication: determining, by the controller, that at least one deactivation condition has been met; and in response to the at least one deactivation condition being met, returning to a standard operation mode whereby the vehicle is operated according to the first control strategy.

In some embodiments, the method further includes determining, by the controller, that a speed of the engine has surpassed a threshold engine speed; and the controller controls the engine according to the second control strategy in response to receiving the mode indication, and determining that the engine speed has surpassed a threshold engine speed.

According to yet another aspect of the present technology, there is provided a vehicle including a frame; at least two ground engaging members connected to the frame; a braking system operatively connected to at least one of the at least two ground engaging members; at least seat connected to the frame; an engine supported by the frame; a turbocharger operatively connected to the engine; a controller communicatively connected to the engine; and an accelerator communicatively connected to the controller, the controller being configured to perform the steps of: controlling an engine of the vehicle according to a first control strategy; receiving a mode indication indicating that an operator of the vehicle has selected a launch mode for accelerating the vehicle; in response to receiving the mode indication, controlling the engine according to a second control strategy; while controlling the engine according to the second control strategy, determining an accelerator position of an accelerator of the vehicle; in response to the accelerator position being greater than zero, controlling the engine to: increase, according to the accelerator position, an opening of a throttle valve of the engine, and control operational conditions of the engine to limit engine torque output; while controlling the engine according to the second control strategy, receiving an indication to end control by the second control strategy; and in response to receiving the indication, controlling the engine according to the first control strategy, controlling the engine according to the first control strategy with the braking system having been released causing the vehicle to accelerate from rest, a first rate of acceleration from rest of the vehicle being greater than a second rate of acceleration from rest of the vehicle for corresponding changes in accelerator position, the first rate of acceleration corresponding to the vehicle accelerating from rest after sequentially controlling the engine according to the first and second control strategies; the second rate of acceleration corresponding to the vehicle accelerating from rest by controlling the engine according to the first control strategy without previously controlling the engine according to the second control strategy.

For purposes of this application, terms related to spatial orientation such as forwardly, rearward, upwardly, downwardly, left, and right, are as they would normally be understood by an operator of a vehicle sitting thereon in a normal riding position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. The explanations provided above regarding the above terms take precedence over explanations of these terms that may be found in any one of the documents incorporated herein by reference.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, except where otherwise noted.

DETAILED DESCRIPTION

The present technology is described herein with respect to a snowmobile 10 having an internal combustion engine and two skis, and further with respect to an all-terrain vehicle (ATV) with an internal combustion engine and four wheels. However, it is contemplated that some aspects of the present technology may apply to other types of vehicles such as, but not limited to, snowmobiles with a single ski, road vehicles having two, three, or four wheels, off-road vehicles, all-terrain vehicles with more or fewer wheels, and side-by-side vehicles.

Figure 1:
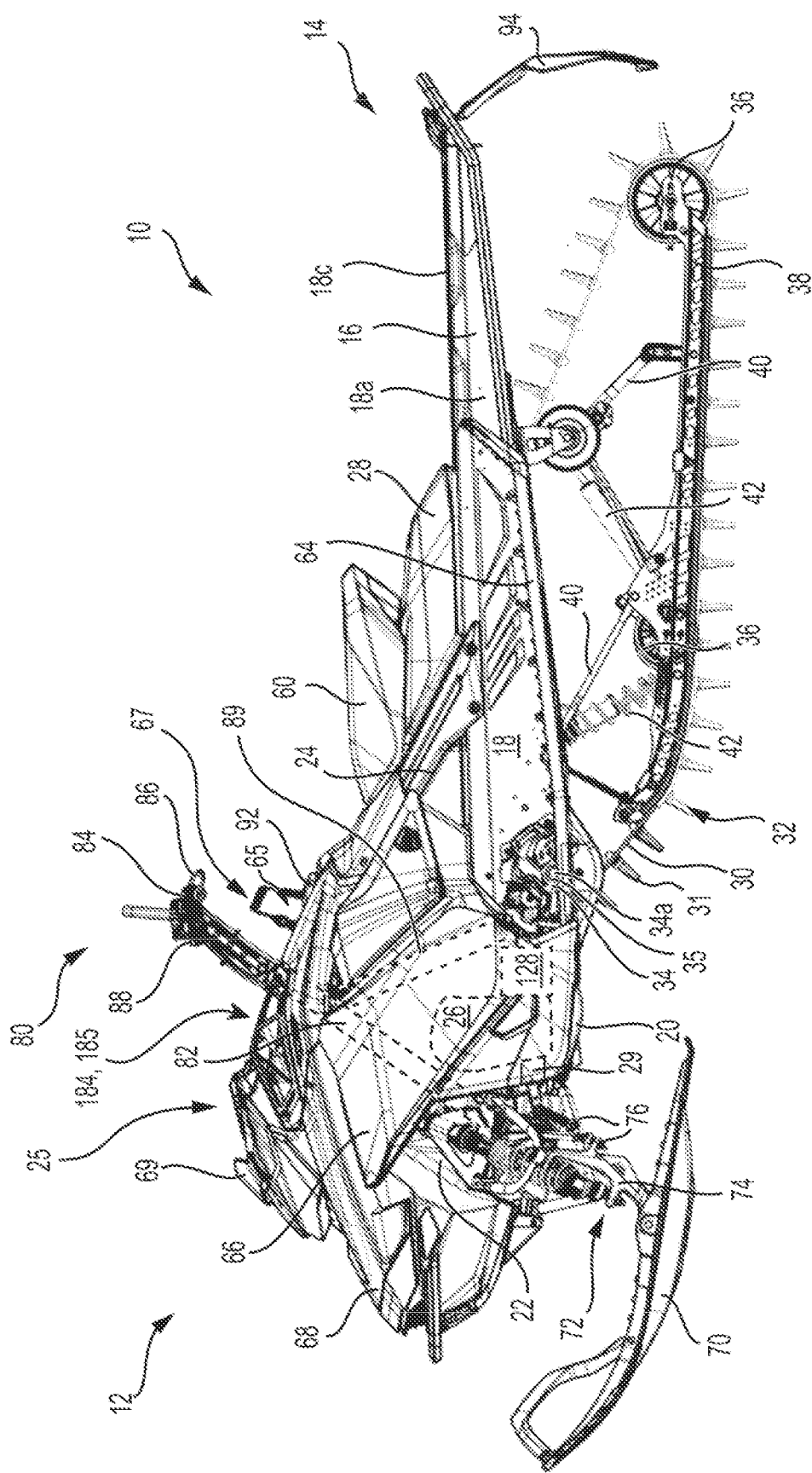
FIG. 1 is a left side elevation view of a snowmobile.
Figure 2:
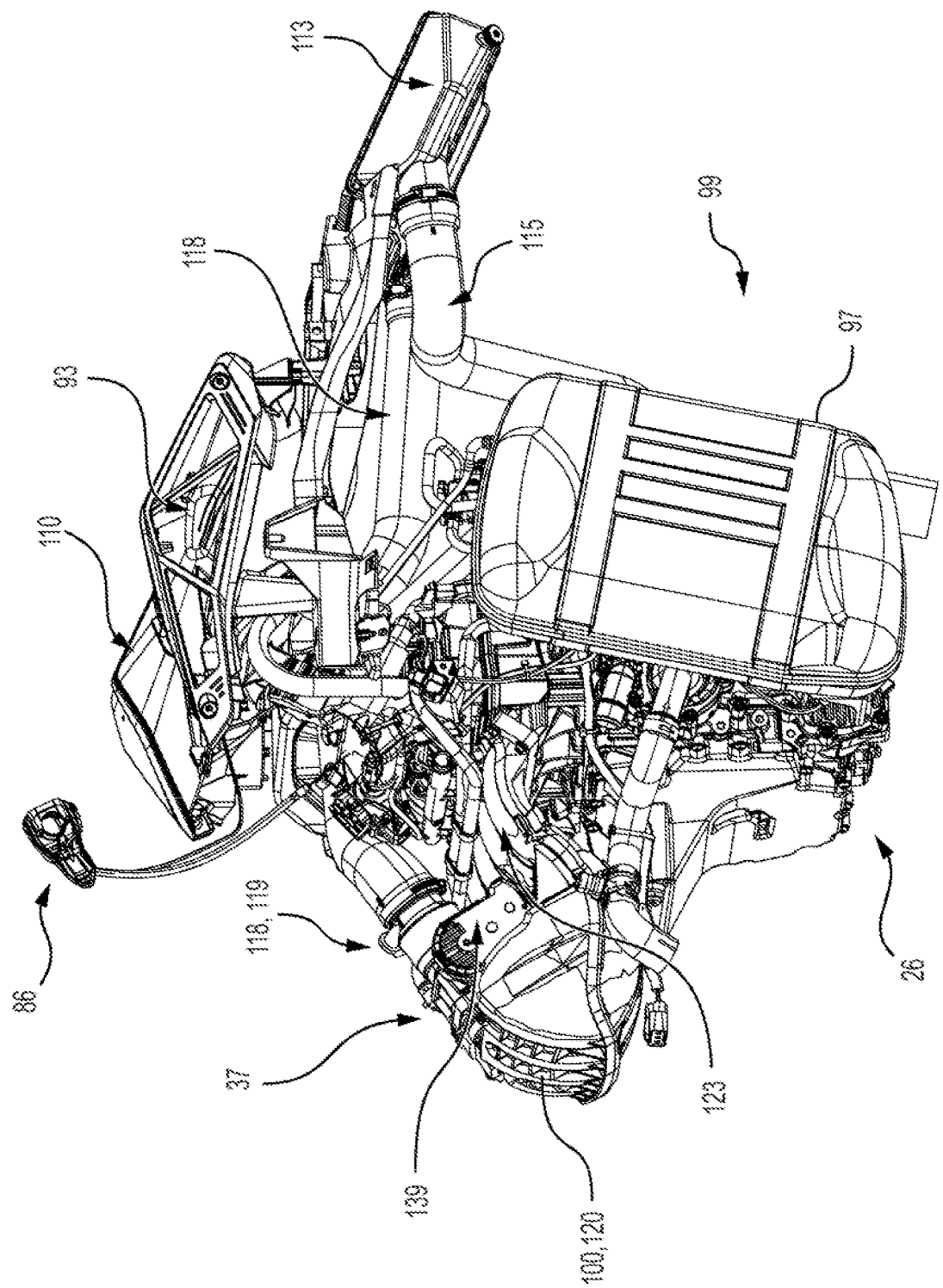
FIG. 2 is a top, rear, right side perspective view of an engine, air intake system and exhaust system of the snowmobile of FIG. 1.

With reference to FIGS. 1 and 2, a snowmobile 10 according to the present technology will be described. The snowmobile 10 includes a forward end 12 and a rearward end 14. The snowmobile 10 includes a vehicle body in the form of a frame or chassis 16 which includes a tunnel 18, an engine cradle portion 20, a front suspension module 22 and an upper structure 24.

An internal combustion engine 26 is carried in an engine compartment defined in part by the engine cradle portion 20 of the frame 16. A fuel tank 28, supported above the tunnel 18, supplies fuel to the engine 26 for its operation. The engine 26 receives air from an air intake system 100. The engine 26 and the air intake system 100 are described in more detail below.

An endless drive track 30 is positioned at the rear end 14 of the snowmobile 10. The drive track 30 is disposed generally under the tunnel 18 and is operatively connected to the engine 26 through a continuously variable transmission (CVT) 128 (shown schematically). The endless drive track 30 is driven to run about a rear suspension assembly 32 operatively connected to the tunnel 18 for propulsion of the snowmobile 10. The endless drive track 30 has a plurality of lugs 31 extending from an outer surface thereof to provide traction to the track 30.

The rear suspension assembly 32 includes drive sprockets 34, idler wheels 36 and a pair of slide rails 38 in sliding contact with the endless drive track 30. The drive sprockets 34 are mounted on an axle 35 and define a sprocket axis 34a. The axle 35 is operatively connected to a crankshaft 126 (FIG. 3) of the engine 26 via the CVT 128. The slide rails 38 are attached to the tunnel 18 by front and rear suspension arms 40 and shock absorbers 42. It is contemplated that the snowmobile 10 could be provided with a different version of a rear suspension assembly than the one shown herein.

At the rear end of the snowmobile 10, a snow flap 94 extends downward from the rear end of the tunnel 18. The snow flap 94 protects against dirt and snow that can be projected upward from the drive track 30 when the snowmobile 10 is being propelled by the moving drive track 30. It is contemplated that the snow flap 94 could be omitted.

A straddle seat 60 for receiving an operator of the snowmobile 10 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate the operator, also referred to as a driver, of the snowmobile 10. The seat 60 could also be configured to accommodate a passenger. A footrest 64 is positioned on each side of the snowmobile 10 below the seat 60 to accommodate the driver's feet.

The snowmobile 10 includes an ignition key base 65 mounted to the snowmobile 10 forward of the seat 60. It is contemplated that parts of the base 65 could be integral with the top surface of the snowmobile 10. The base 65 is adapted to receive an ignition key 67 (illustrated as engaged with the base 65 in FIG. 1). The key 67 serves, at least in part, as an anti-theft system as the snowmobile 10 is prevented from starting when the ignition key 67 is not engaged with the base 65. In cases where the snowmobile 10 is to be operated by a less experienced operator, by a riding student or a renter for example, the key 67 could be replaced with a learner key (not shown) which would limit certain operational characteristics. For example, the learner key could limit aspects including, but not limited to: snowmobile top speed and acceleration. In some embodiments, the key 67 could be equipped with a security system such as, for example, Bombardier Recreational Product's Digitally Encoded Security System (DESS™). It is also contemplated that different anti-theft and/or security systems could be implemented by the snowmobile 10 and/or the key 67.

At the front end 12 of the snowmobile 10, fairings 66 enclose the engine 26 and the CVT 128, thereby providing an external shell that not only protects the engine 26 and the CVT 128, but can also make the snowmobile 10 more aesthetically pleasing. The fairings 66 include a hood 68 and one or more side panels which can be opened to allow access to the engine 26. A windshield 69 connected to the fairings 66 acts as a wind screen to lessen the force of the air on the rider while the snowmobile 10 is moving. It is contemplated that the windshield 69 could be connected directly to a handlebar 84.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82 (schematically illustrated).

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. An accelerator lever 86 (also referred to as an accelerator, throttle lever, or throttle operator) in the form of a thumb-actuated lever is mounted to the right side of the handlebar 84. Other types of accelerator or throttle operators, such as a finger-actuated throttle lever and a twist grip, are also contemplated. A brake actuator 88, in the form of a hand brake lever 88, is provided on the left side of the handlebar 84 for controlling a braking system 89 of the snowmobile 10 (shown schematically in FIG. 1). In the case of implementation of the present methods or systems with different vehicles, for example all-terrain vehicles (ATVs) and/or side-by-side vehicles (SSVs), it is contemplated that the brake actuator could be in the form of a foot-actuated brake (i.e. a brake pedal).

A mode input 184, specifically a mode selection button 184, is disposed in a display cluster 185 forward of the handlebar 84. In some embodiments, it is contemplated that the button 184 could be mounted to the left side of the handlebar 84. By pressing on the mode selection button 184, the operator can choose between different driving modes of the snowmobile 10, in the present embodiment, between sport, standard, and economy modes. Additional or alternative modes are also contemplated. As will be described in more detail below, a launch control mode can also be chosen via the mode selection button 184 to aid in accelerating the snowmobile 10 from rest. The launch control mode is selected by first selecting the sport mode by repeatedly pushing the mode selection button until the sport mode has been selected, and then holding the button 184 down until the launch control mode has been further selected. It is contemplated that the mode input 184 could be implemented in different manners, including for example via a touch screen or a dial. It is also contemplated that the snowmobile 10 could include a mode input button dedicated for selecting the launch control mode. It is further contemplated that the launch control mode could be a default setting as part of the sport mode. In some non-limiting embodiments, the launch control mode could instead be selected without first selecting sport mode.

The snowmobile 10 includes other components such as an interactive touch screen and the like. In some embodiments, selection of the different drive modes and the launch control mode described further below, could be done using the interactive touch screen or a handlebar mounted button in some embodiments.

Figure 3:
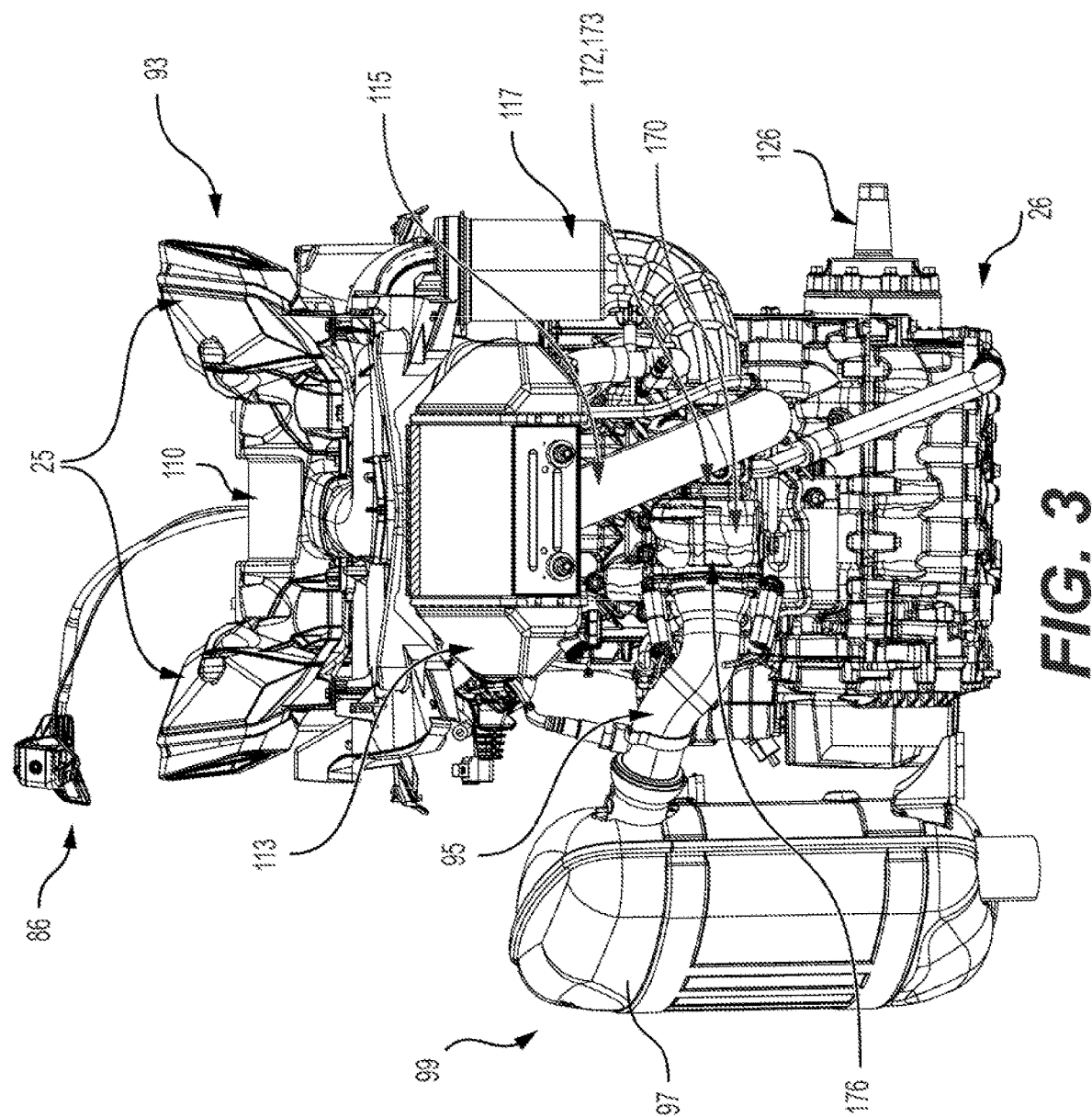
FIG. 3 is a front elevation view of the engine, air intake system and exhaust system of FIG. 2.

With additional reference to FIGS. 3 and 4A, the engine 26 and the air intake system 100 will be described in more detail. Air from the atmosphere flows through side apertures 93 defined in an upper portion 25 of the upper structure 24 of the chassis 16 (FIG. 2). The air then flows into a secondary airbox 110. The secondary airbox 110 is disposed above the front suspension module 22. A conduit 117 (FIG. 3) fluidly connects the secondary airbox 110 to a turbocharger 170, specifically to an inlet 173 of an air compressor 172 (FIG. 3) of the turbocharger 170 disposed on the front side of the engine 26. It is contemplated that the secondary airbox 110 could be omitted and that air from the atmosphere could directly enter into the inlet 173 without going through the secondary airbox 110.

Air from the atmosphere, passing through the secondary airbox 110 and into the air compressor 172 via the conduit 117 and inlet 173, is compressed by the air compressor 172. The compressed air then flows out of the air compressor 172 through an outlet 174, into a conduit 115 and into an intercooler 113. The intercooler 113 is fluidly connected to a primary airbox 120 via the conduit 118 (FIG. 2) which is in turn connected to the engine 26 via air outlets 123 of the primary airbox 120. The primary airbox 120 includes an intake air temperature sensor 121 (shown schematically in FIG. 4A) for measuring the temperature of air flowing into the engine 26. In some embodiments, the airbox 120 could additionally or alternatively include an air pressure sensor.

Figure 4A:
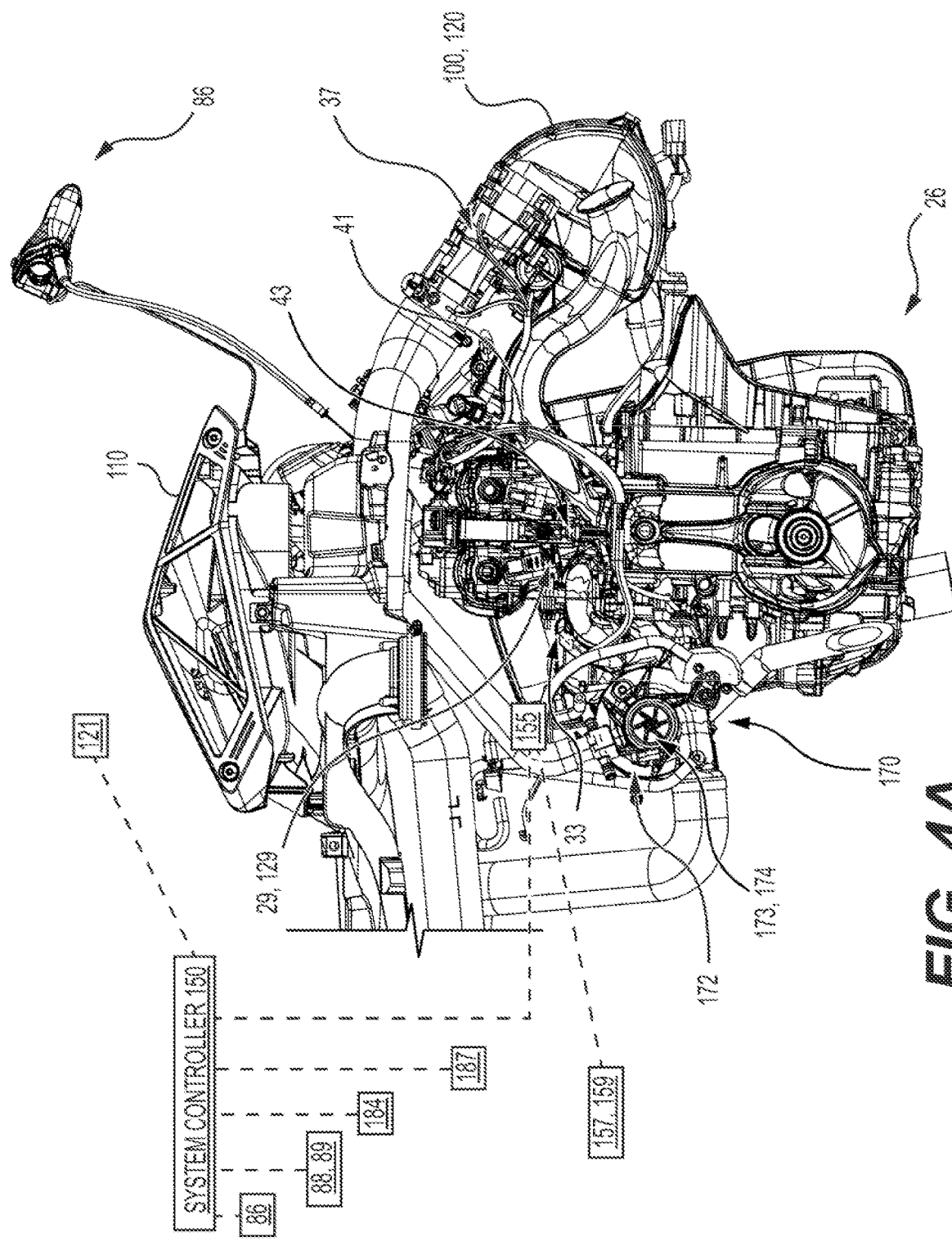
FIG. 4A is a cross-sectional view of the engine and some portions of the air intake system and the exhaust system of FIG. 2.
Figure 4B:
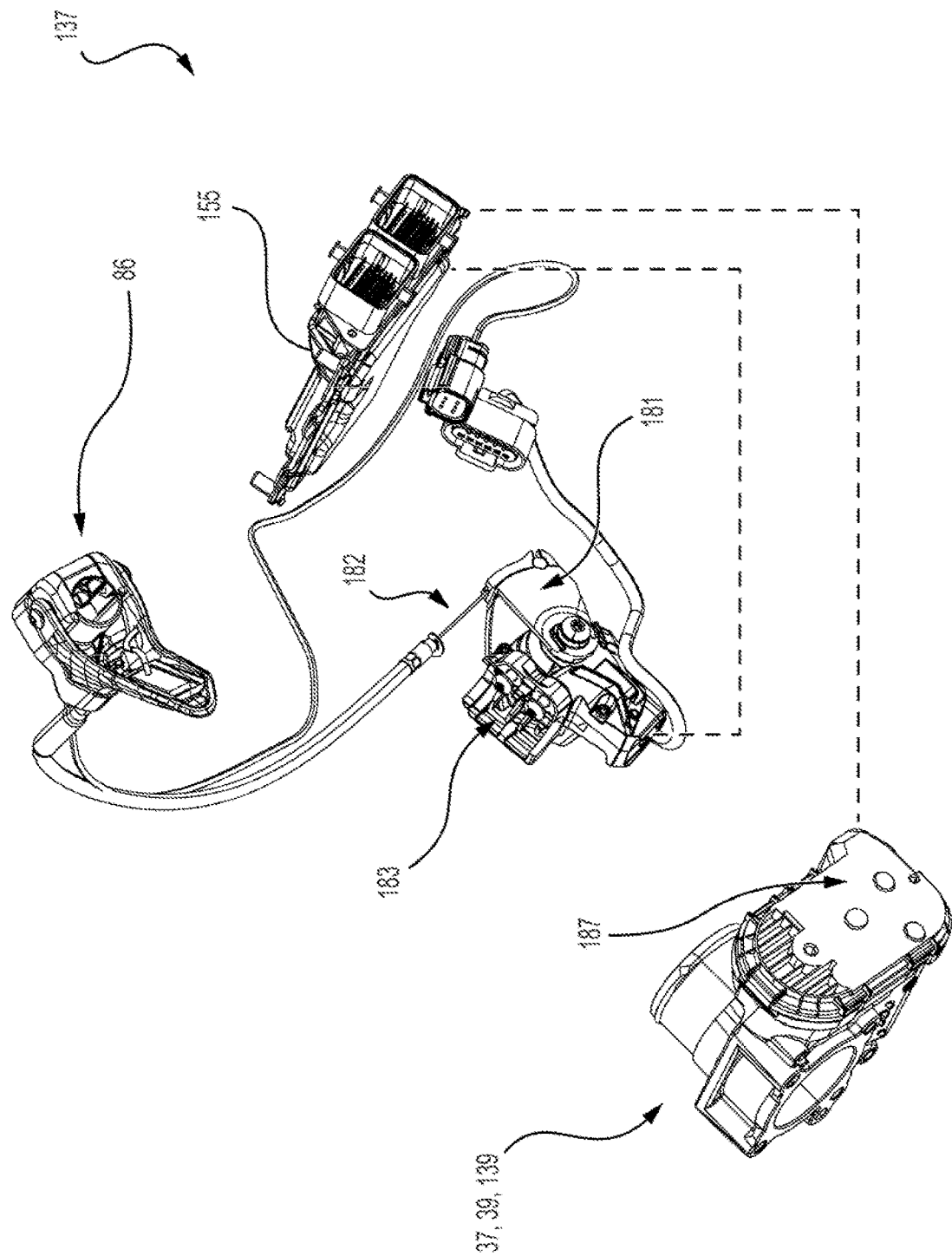
FIG. 4B is a perspective view of a throttle system of the snowmobile of FIG. 1.

With additional reference to FIG. 4B, the engine 26 and the turbocharger 170 are described in further detail. The engine 26 is an inline, three-cylinder, four-stroke, internal combustion engine. The cylinders of the engine 26 are oriented with their cylindrical axes disposed vertically. It is contemplated that the engine 26 could be configured differently. For example, the engine 26 could have more or fewer cylinders, and the cylinders could be arranged in a V-configuration instead of in-line. It is contemplated that in some embodiments the engine 26 could be a two-stroke internal combustion engine, a carbureted engine, or any other suitable engine capable of propelling the snowmobile 10.

The snowmobile 10 includes an engine control unit (ECU) 155, shown in FIG. 4B and schematically in FIG. 4A, for communicating with and controlling the engine 26. The ECU 155 includes at least a non-transitory computer readable medium (not shown) and a processor (not shown). The processor of the ECU 155 is configured to perform a number of operations including speed and torque limiting operations described below with respect to methods for accelerating the snowmobile 10 from rest. It is contemplated that the functions of the ECU 155 could be split between multiple ECUs.

An engine speed sensor 157 and an engine temperature sensor 159 (shown schematically) are disposed in the engine 26. The engine speed sensor 157 senses the rotational speed (RPM) of the engine 26. The engine temperature sensor 159 measures the temperature of engine coolant of the engine 26. The engine sensors 157, 159 are communicatively connected to the ECU 155. In some embodiments, the engine sensors 157, 159 could be implemented as a unified engine sensing unit. It is contemplated that additional or alternative sensors could be used to monitor the engine 26.

As shown in FIGS. 1, 2, and 4A, the engine 26 receives air from the air intake system 100, specifically from the primary airbox 120, via engine air inlets 27 defined in the rear portion of each cylinder of the engine 26. Each air inlet 27 is connected to a single throttle body 37 of the air intake system 100; a throttle system assembly 137 is illustrated in isolation in FIG. 4B. The throttle body 37 has a throttle valve 39 which rotates to regulate the amount of air flowing through the throttle body 37 into the corresponding cylinder of the engine 26. A throttle valve actuator 139 is operatively connected to the throttle valve 39 to change the position of the throttle valve 39 and thereby adjust the opening of the throttle valve 39 with operation of the accelerator lever 86 on the handlebar 84. The accelerator lever 86 is movable between a 0% position (where the throttle valve 39 is closed), a 100% position (where the throttle valve 39 is at its most open position), as well as to a plurality of positions between the 0% and the 100% positions (where the throttle valve 39 is partially opened to a position based at least in part on the lever position).

In the present embodiment, the throttle system assembly 137 is a hybrid mechanical cable and drive-by-wire system (see FIG. 4B), although this is simply one non-limiting embodiment. The position and the movement of the throttle valve 39 is monitored by a throttle valve position sensor 187 operatively connected to the throttle valve 39. The actuator 139 changes the position of the throttle valve 39 based on input signals received from an electronic control module 189 which in turn receives inputs signals from a position sensor 183 associated with the accelerator lever 86 on the handlebars 84.

The engine 26 receives fuel from the fuel tank 28 via injectors 41 shown in at least FIG. 4A. The fuel-air mixture in each of the cylinders of the engine 26 is ignited by an ignition system including spark plugs 43 (best seen in FIG. 4A). Engine output power, torque and engine speed are determined in part by throttle opening and in part by the ignition timing, and also by various characteristics of the fuel-air mixture such as its composition, temperature, pressure and the like. Control of engine ignition will be described in more detail below.

Exhaust gases resulting from the combustion events in the cylinders are expelled from the engine 26 via an exhaust system 99. An exhaust outlet 29 is defined in the front portion of each cylinder of the engine 26, each cylinder has an exhaust outlet 29 and an exhaust valve 129. The exhaust outlets 29 are fluidly connected to an exhaust manifold 33 which is fluidly connected to the turbocharger 170.

The turbocharger 170 is operatively connected to the engine 26 as is mentioned above. The turbocharger 170 compresses air and feeds it to the engine 26. The turbocharger 170 includes the air compressor 172 and an exhaust turbine 176 (FIG. 3). The air compressor 172 includes a compressor wheel 174 and is part of the air intake system 100 (described above). Intake air flowing past the rotating compressor wheel 172 is compressed thereby. The rotation of the compressor wheel 172 is powered by a turbine wheel of the exhaust turbine 176. The turbine wheel is rotated by exhaust gases expelled from the engine 26 and directed to flow over the blades of the turbine wheel.

The exhaust system 99 further includes a muffler 97 for removing exhaust gas from the snowmobile 10. The muffler 97 is fluidly connected to the turbocharger 170, specifically an outlet of the compressor, by an exhaust collector 95 (FIG. 3). It is contemplated that different arrangements could be employed to connect the muffler 97 to the exhaust collector 95.

As is illustrated schematically in FIG. 4A, the snowmobile 10 further includes a controller 150. The controller 150 includes at least a non-transitory computer readable medium (not shown) and a processor (not shown). The processor of the controller 150 is configured to perform a number of operations including methods described below for accelerating the snowmobile 10 from rest (the above mentioned launch control mode). It is contemplated that the functions of the controller 150 could be split between multiple controllers. It is also contemplated that the ECU 155 could perform the processes and methods of the controller 150 of the embodiments described herein, and in such cases the controller 150 could be excluded.

The controller 150 is operatively connected to the engine control unit (ECU) 155 of the snowmobile 10 (shown schematically). The ECU 155 is in turn operatively connected to the engine 26, such that the controller 150 can monitor and control engine operations via the ECU 155. It is contemplated that the controller 150 operations described herein could be performed by the ECU 155 in some embodiments. As is mentioned above, the ECU 155 is communicatively connected to the engine sensors 157, 159 for receiving information therefrom with respect to engine speed and temperature respectively. The controller 150 is thus connected to the engine sensors 157, 159 via the ECU 155. It is contemplated that the controller 150 could be communicatively connected to alternative and/or additional sensors via the ECU 155 in some embodiments. The controller 150 and the ECU 155 are also communicatively connected to the mode input button 184, in order to control the engine 26 and the snowmobile 10 according to the mode selected by the operator.

The controller 150 is further operatively and communicatively connected to the intake air temperature sensor 121 for monitoring the temperature of air entering the engine 26 and the throttle valve position sensor 187 for determining the position of the throttle valve 39, a rate of opening of the throttle valve 39, the actuator position sensor 183, or both. The controller 150 is further communicatively connected to the accelerator lever position sensor 183 for sensing the accelerator lever position. The controller 150 is also communicatively connected to the brake lever 88 and the braking system 89 for sensing brake activation status of the braking system 89.

Depending on the embodiment, the controller 150 could be connected to various alternative and/or additional sensors for monitoring components or characteristics of the engine 26 and/or the snowmobile 10. For example, the controller 150 could be communicatively connected to an exhaust pipe temperature sensor to monitor the temperature of an exhaust pipe and/or the temperature of exhaust exiting the engine 26.

Figure 5:
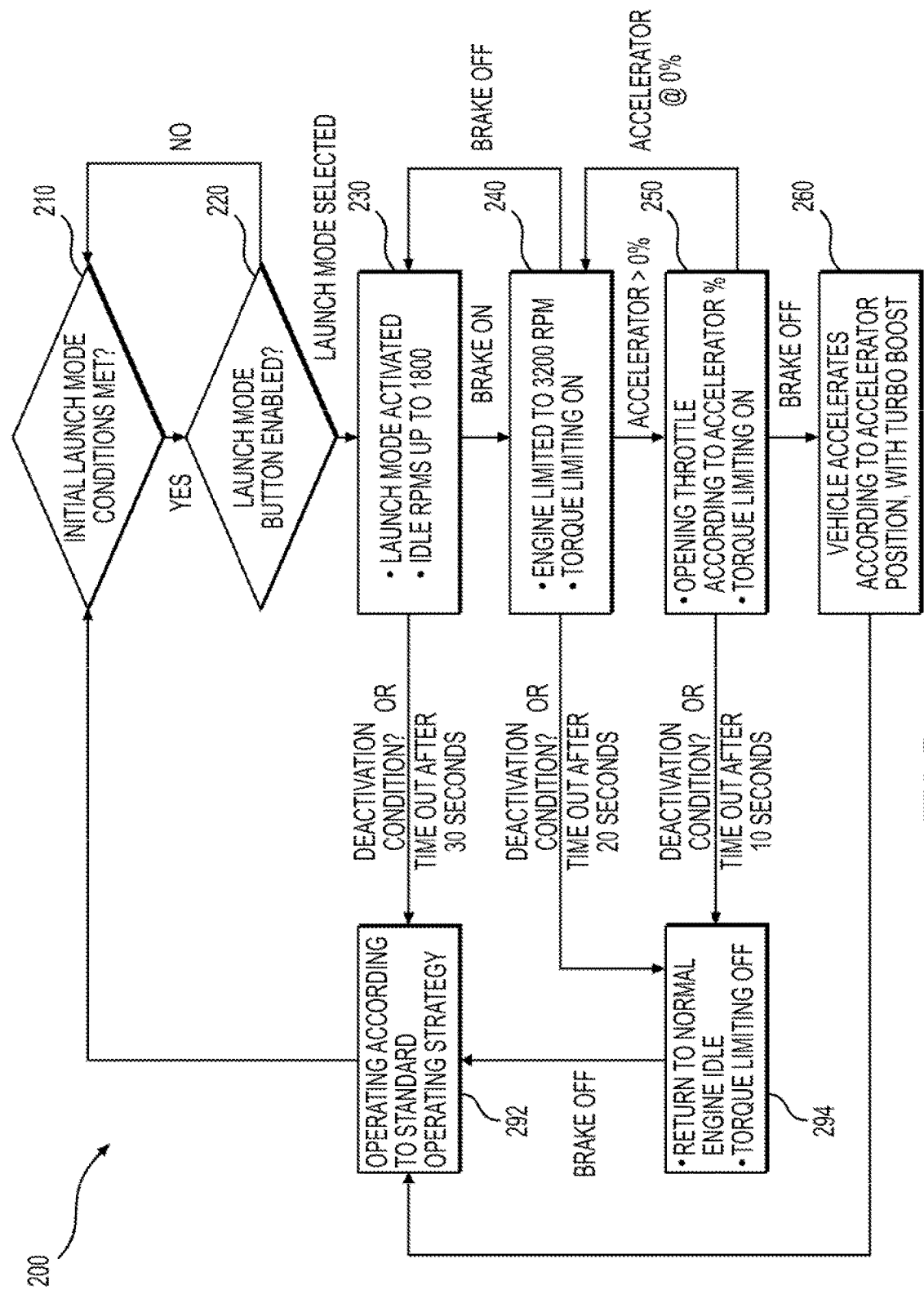
FIG. 5 is a flowchart illustrating one non-limiting embodiment for controlling the snowmobile of FIG. 1 to accelerate from rest.
Figure 6:
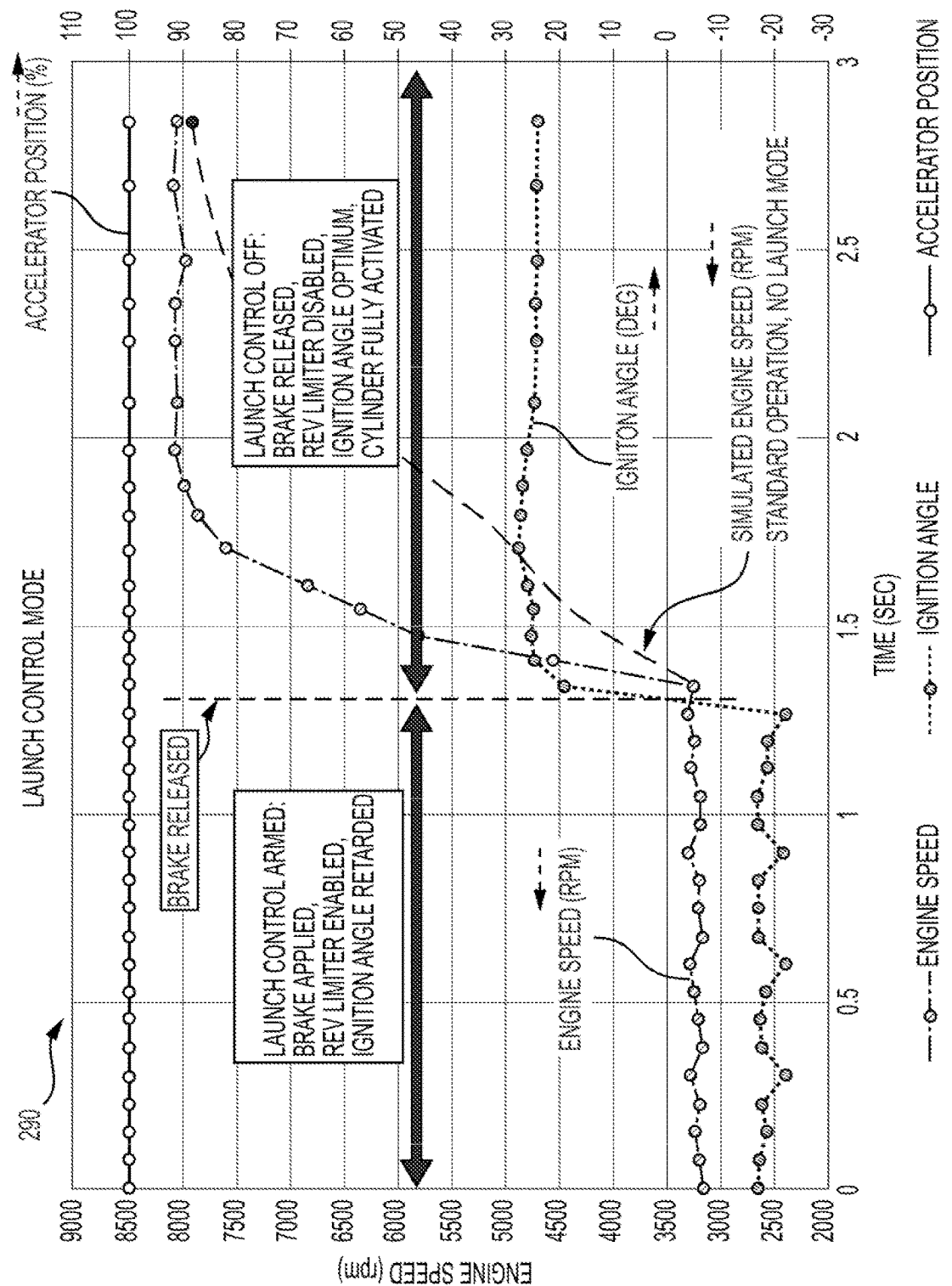
FIG. 6 is a graph depicting engine speed, accelerator position, and ignition angle during a portion of the control of the snowmobile set out in FIG. 5.

Accelerating the snowmobile 10 from rest, using an operating mode referred to herein as the launch control mode, in accordance with non-limiting embodiments of the present technology will now be described in more detail with reference to FIGS. 5 and 6. An overview of steps taken by the operator and operations performed by the controller 150 and/or the snowmobile 10 according to the launch control mode is illustrated by a flowchart 200 presented in FIG. 5.

The controller 150 first determines if the selection of launch control mode should be made available to the operator of the snowmobile 10 at operation 210. The determination is made by the controller 150 by confirming that one or more activation conditions, also referred to as initial mode conditions, have been met. Confirmation by the controller 150 that the activation conditions have been met is done at least upon ignition of the snowmobile 10, as well as in response to the snowmobile 10 subsequently coming to rest. The controller 150 further verifies that activation conditions have been met at regular spaced intervals, for example every 10 milliseconds, while the snowmobile 10 is running. In some embodiments, the regularly spaced time intervals could be greater or lesser than 10 ms. It is also contemplated that the controller 150 could verify the activation conditions in response to the snowmobile 10 is put into sport mode or another selected mode.

The activation conditions to be met in order to make the launch control mode available for the operator to activate include the following conditions, but in different embodiments the controller 150 may consider only some of these or additional and/or alternative conditions. First, the snowmobile 10 should be in a forward gear, with the engine 26 running. The snowmobile 10 should be in the sport mode, as chosen through the mode input button 184. The snowmobile 10 should have a speed of 0 km/h (0 mph), such that the snowmobile 10 is at rest. The speed of the snowmobile 10 is determined by a speed sensor (not shown). The temperature of the engine 26, as determined by the engine temperature sensor 159, should be between a minimum and a maximum mode-acceptable engine temperature. The temperature of intake air entering the engine 26, as determined by the intake air temperature sensor 121, should also be between a minimum and a maximum mode-acceptable air temperature. The exact minimum and maximum temperatures are stored to computer-implemented storage connected to the controller 150, although it is contemplated that the minimum and maximum engine temperatures could be calculated by the controller 150 directly. The controller 150 also determines that the key 67 connected to the snowmobile 10 is a key programmed to allow the launch control mode, e.g. is not a learner key. The accelerator lever position should be at 0%, where the operator has not applied any throttle and the snowmobile 10 is idling. Further, a maximum number of previous launch control mode starts, for a predetermined time period, should not have been surpassed. In some embodiments, for instance, there may be a limit on the number of times acceleration from rest using the launch control mode may be permitted for a particular time frame of the snowmobile 10, and the next acceleration from rest using the launch control mode may not be allowed until the snowmobile 10 has first been shut down.

As part of the activation or initial mode conditions, the controller 150 also determines that the snowmobile 10 has no pre-determined unacceptable faults. Specifically, while one or more faults or errors in components of snowmobile 10 may be sensed and/or identified by the controller 150 during determination of the activation conditions, it is contemplated that some "faults" detected may be acceptable and should not impede implementation of the launch control mode. There are some faults, however, that are determined to be incompatible with implementation of the launch control mode and thus are labeled "unacceptable". As one non-limiting example of such an unacceptable fault, the controller 150 may not make the launch control mode available if it is determined that the position sensor 183 for sensing the position of the accelerator lever 186 is dysfunctional or not communicating with the controller 150. As one other non-limiting example of such an unacceptable fault, the controller 150 may not make the launch control mode available if it is determined that the valve position sensor 187 is dysfunctional or not communicating with the controller 150.

If the activation conditions (initial mode conditions) are met, the controller 150 enables the mode input 184 to allow the operator to select the launch control mode at operation 220.

In response to the operator selecting the launch control mode via the mode input 184, the controller 150 activates (or "arms") the launch control mode to control the snowmobile 10 in operation 230. Prior to selection of the launch control mode, the snowmobile 10 and the engine 26 are controlled according to a standard control strategy. Control strategies generally vary between different embodiments of the engine 26 and a person skilled in the art would understand adaptations necessary for a particular embodiment. For example, one such strategy could include sensing a throttle lever angle, determining a torque request based on this lever angle, and controlling a throttle valve opening, fuel injection amount and ignition timing to achieve the requested torque. Control strategies are generally performed within a repeating loop. Once the operator has chosen the launch control mode, the controller 150 controls the snowmobile 10 and the engine 26 according to a launch control strategy, different from the standard control strategy, which provides instructions for the following operations.

The controller 150, in conjunction with the ECU 155, causes the engine 26 to increase engine speed (increase idle) in response to the selection of the launch control mode. The idle speed is increased up to a maximum of about 1800 RPM, although it is contemplated that the maximum idle speed could vary. The idle increase serves as an auditory indication to the operator that the launch control mode has been activated. In some embodiments, the controller 150/ECU 155 may not increase the engine speed (idle). In some embodiments, a different auditory indication could be included, for example a tone being played when the launch control mode is selected.

In response to the operator subsequently activating the braking system 89 via the brake lever 88, the controller 150 then applies an engine speed limit to the engine 26 of approximately 3200 RPM at operation 240. If the operator has previously activated the braking system 89, the controller 150 could perform the operation 240 immediately following completion of operation 230. The exact speed to which the engine 26 is limited could vary, depending on the particular embodiment of the engine 26 for example, but the speed is generally chosen to be less than an engagement speed of the CVT 128 to prevent forward movement of the snowmobile 10. In the present embodiment, the engagement speed of the CVT 128 is approximately 3500 RPM, but this could vary depending in different embodiments of snowmobiles, engines, and/or CVTs.

If, subsequent to applying the engine speed limit of approximately 3200 RPM at operation 240 and prior to completing any subsequent operations, the controller 150 determines that the braking system 89 has been deactivated, the engine speed is decreased to its previous high idle speed (up to 1800 RPM) if the engine speed had subsequently increased, and the engine speed limit previously applied is removed. The launch control mode remains active, and the controller 150 once again applies the engine speed limit in response to the operator subsequently activating the braking system 89.

In response to the operator moving the accelerator lever 86 to a greater than 0% position, the controller 150 then causes the throttle valve 39 to open according to the accelerator lever 86 position at operation 250, and the standard control strategy is followed until the engine speed approximately reaches the applied engine speed limit. Once the engine speed reaches the applied engine speed limit, the controller 150 controls the throttle valve position, fuel injection and ignition timing by the launch control strategy that limits the torque produced which prevents the engine speed from going beyond the engine speed limit applied at operation 240, but increase the air flowing through the engine 26 as will be discussed further below. It should be noted that the operations 240 and 250 could be combined into one operation in at least some embodiments. It is contemplated that a different control strategy could be used as soon as the launch mode is activated in operation 240 regardless of the actual engine speed.

By opening the throttle valve 39, air flow through the engine 26, as well as the turbocharger 170, increases. Increasing air flow through the turbocharger 170, while the snowmobile 10 remains at rest, allows the turbocharger 170 to spool-up and be fully prepared to supply turbocharger boost during initial acceleration from rest. In order to avoid engagement of the CVT 128 and the snowmobile 10 overcoming the braking system 89 (and accelerating prematurely) due to increasing torque and speed following opening the throttle valve 39, the controller 150 applies a torque limiting process.

Controlling the engine 26 to limit torque and engine speed, while opening the throttle valve 39, is managed by the controller 150 as follows. As the engine speed increases beyond or approaches approximately 3200 RPM and approaches an engagement speed for the CVT 128, the controller 150 causes a change in the ignition timing for the cylinders such that the engine 26 is firing inefficiently by delaying combustion in the cylinders. Specifically, as is illustrated in the graph 290 of FIG. 6, the ignition angle is set to approximately −20 degrees from the top dead center (TDC) position for each piston, such that the spark plugs 43 are set to ignite the fuel-air mixture when the corresponding piston is at −20 degrees from the TDC position (20 degrees past the TDC position). As the standard ignition timing is to fire approximately 25 degrees from the TDC position, the force produced by each combustion cycle is reduced. It is noted that the same air flow through the engine 26 is maintained as when the engine 26 is running in a standard manner, such that the exhaust gas flowing toward the turbocharger 170 continues generally unchanged in volume.

In some cases, the torque limiting process described above may not be sufficient to limit engine speed or torque, for instance when the throttle valve 39 is fully open (the accelerator position is 100%). In such a case, the controller 150 further acts to limit engine speed and torque by deactivating one or more of the cylinders of the engine 26. When deactivating a cylinder, the piston continues to cycle, but the fuel injectors 41,45 do not inject fuel and the spark plugs 43 do not fire. When deactivating more than one cylinder, different cylinders are deactivated during different cycles, but different approaches are contemplated. For instance, the pattern of activation/deactivation of cylinders could be chosen to manage vibration and heating effects in the engine 26. As was the case when delaying ignition, air flow continues through the engine 26, aiding to spool up the turbocharger 170.

Having increased the throttle valve opening in operation 250 and with the turbocharger 170 being at least partially spooled-up, the operator then releases the brake lever 88 to allow the snowmobile 10 to accelerate ("launch"). In response to detecting the braking system 89 being released, the controller 150 returns the engine to the standard control strategy, removing all engine speed and torque limiting. As is illustrated in the example operation graph 290 of FIG. 6, launch control is released when the brake is released, where the ignition angle reverts back to the optimal ignition angle (approximately 25 degrees), all cylinders are all fully activated, and the accelerator position is maintained. Having prepared the engine 26 and the turbocharger 170, the engine speed climbs relatively rapidly, from about 3200 RPM to about 8000 RPM over a time frame of about one-half (0.5) second. In comparison, a simulated engine speed curve (in broken line) shows that a similar acceleration (from about 3200 RPM to 8000 RPM) without using the launch control mode of the present description would take about 1.5 seconds. It should be noted that the illustrated simulation is simply one non-limiting example, and the exact acceleration time depends on the particular vehicle embodiment.

If at any point, while the launch control mode is activated (from operation 230 to just prior to the brake lever 88 being released), the controller 150 determines that one or more deactivation conditions have been met, the controller 150 deactivates the launch control mode and returns the snowmobile 10 to standard operations (see step 292 of the method 300 as described below).

The controller 150 deactivates the launch control mode and returns the snowmobile 10 to standard operations upon detection of one or more of the following deactivation conditions. Deactivation of the launch control mode could occur upon detection of one or more of: the snowmobile 10 not being in a forward gear; the engine 26 not running; the snowmobile 10 not being in sport mode; the snowmobile 10 having a speed of greater than 0 km/h (0 mph), i.e. the snowmobile 10 not being at rest; the temperature of the engine 26 exceeding mode-acceptable engine temperature limits; and detection of an unacceptable fault. It is contemplated that in different embodiments the controller 150 may consider only some of these, or additional or alternative conditions.

The deactivation conditions further include time limits on some of the operations described above to aid in preventing the engine 26 from overheating. As is illustrated in FIG. 5, if the braking system 89 has not been activated within 30 seconds of activating the launch control mode and increasing the engine speed to about 1800 RPM at operation 230, the controller 150 deactivates, at step 292, the launch control mode and returns the snowmobile 10 and the engine 26 to standard operating conditions. If the accelerator position has not been increased past 0% within 20 seconds after increasing the engine speed to about 3200 RPM at operation 240, the controller 150 returns the engine 26 to normal idle and removes any torque limiting parameters that may have been activated. Similarly, if the braking system 89 have not been deactivated within 10 seconds after opening the throttle valve 39 at operation 250, the controller 150 returns the engine 26 to normal idle and removes any torque limiting parameters that may have been activated. When the braking system 89 has been deactivated anew, the snowmobile 10 then accelerates and is operated according to the standard control strategy, i.e. the standard operating conditions.

Figure 7:
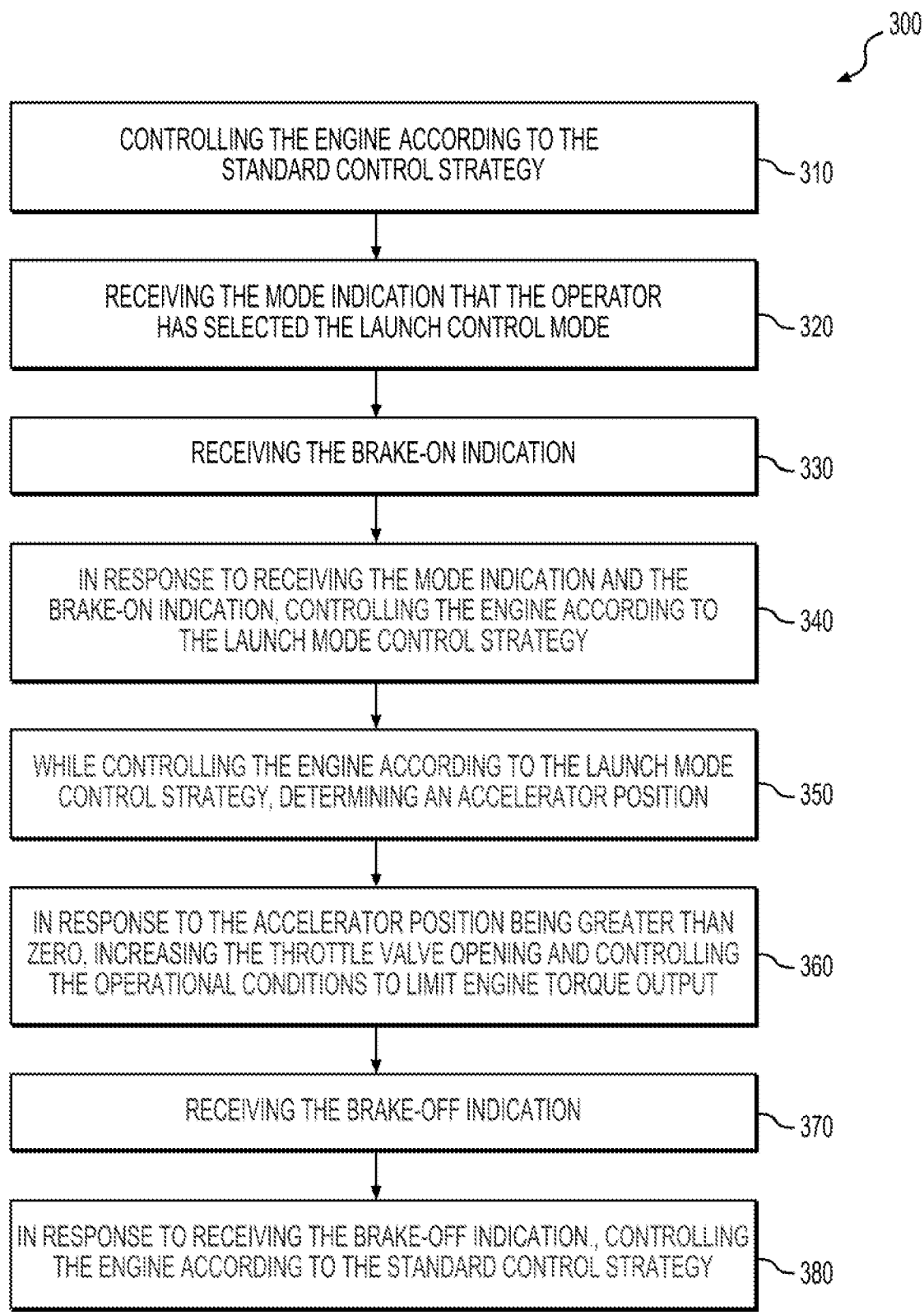
FIG. 7 is a flowchart depicting the control of the snowmobile set out in FIG. 5 in the form of a method.

In reference to FIG. 7, a non-limiting embodiment of controlling the engine 26 and the snowmobile 10, according to the operations described above, is set out in the form of a method 300 performed by the controller 150. In some embodiments, it is contemplated that an additional or substitute computer-implemented system could be used to perform the method 300.

The method 300 begins at step 310, with controlling, by the controller 150, the engine 26 according to the standard control strategy. As is mentioned above, the standard control strategy manages the engine 26 according to standard operational parameters, such as when the snowmobile 10 is being operated according to typical procedures (e.g. being driven) and the engine 26 is not being controlled according to the method 300.

The method 300 then continues, at step 320, with receiving, by the controller 150, a mode indication indicating that the operator of the snowmobile 10 has selected the launch control mode for accelerating the snowmobile 10 from rest. As is described above, the mode indication is received at the controller 150 from the mode input button 184, where the operator selects the launch control mode is made available by the controller 150. In response to receiving the mode indication, the controller 150 activates the launch control mode and continues with the method 300.

In at least some non-limiting embodiments, the controller 150 could determine, prior to receiving the mode indication, that one or more initial mode conditions have been met. As is described above, the initial mode conditions, also referred to as activation conditions, could include a variety of parameters, including but not limited to: the snowmobile 10 being at rest, the temperature of the engine 26 being within minimum and maximum limits, etc. A more complete non-limiting list of possible initial mode conditions is set out above. In such an embodiment, in response to the initial mode conditions being met, the controller 150 could enable the mode input 184.

In some embodiments, in response to receiving the mode indication and prior to controlling the engine 26 according to subsequent steps of the method 300, the controller 150 causes the engine 26 to increase engine speed. As is mentioned above, this increased idle serves as an auditory signal to the operator that the launch control mode has been activated. It is contemplated that the idle may not be increased in at least some embodiments.

The method 300 then continues, at step 330, with receiving, by the controller 150, a brake-on indication indicating that the braking system 89 has been activated.

The method 300 then continues, at step 340, in response to receiving the mode indication and the brake-on indication, with controlling the engine 26 according to a launch control strategy. As is described above, the controller 150 causes the engine 26 to increase engine speed when both the launch control mode is selected and the braking system 89 is activated. Controlling the engine 26 according to the launch control strategy includes increasing the speed of the engine 26, and limiting the torque output of the engine 26 if required. If the increased speed of the engine 26 does not approach the CVT engagement speed, at some instances while controlling the engine 26 according to the launch control mode it may not be necessary to limit torque output. As is described above, controlling operational conditions of the engine 26 to limit engine torque output includes delaying combustion ignition by adjusting the ignition timing and/or deactivating one or more cylinders. It is contemplated that alternative or additional approaches could be used to limit torque output of the engine 26.

The method 300 then continues, at step 350, while controlling the engine 26 according to the launch control strategy, with determining an accelerator position of the accelerator 86. When the accelerator position is at 0%, the operator has not moved the lever 86; when the accelerator positions is greater than 0%, the operator has moved the lever 86 to request engine power.

The method 300 then continues, at step 360, in response to the accelerator position being greater than zero percent, with controlling the engine 26 to increase, according to the accelerator position, an opening of the throttle valve 39 and control operational conditions of the engine 39 to limit engine torque output. As is described above, air flow increases through the engine 26 in response to increasing the opening of the throttle valve 39 according to the accelerator position.

In some embodiments, subsequent to receiving the mode indication and prior to receiving a brake-off indication, the controller 150 could determine that at least one deactivation condition has been met. In response to one or more deactivation conditions being met, the method 300 could then include returning to the standard operation mode whereby the snowmobile 10 is operated according to the standard control strategy.

In some embodiments, while controlling the engine 26 according to the launch control strategy, the controller 150 could determine that one or more of the deactivation conditions have been met. The method 300 could then further include returning to a standard operation mode whereby the snowmobile 10 is operated according to the standard control strategy.

The method 300 then continues, at step 370, while controlling the engine 26 according to the second control strategy, receiving a brake-off indication indicating that the braking system 89 has been released.

The method 300 then terminates, at step 380, in response to receiving the brake off indication, with once again controlling the engine 26 according to the standard control strategy. As the braking system has been released at this point, the snowmobile 10 accelerates from rest per standard operational parameters. Specifically, any torque output or engine speed limiting process applied to the engine 26 (such as combustion delay and/or cylinder deactivation) is removed to allow the engine 26 to speed up and produce torque according to the position of the accelerator lever 86.

As is described above, the rate of acceleration from rest is greater after sequentially controlling the engine 26 according to the launch control strategy (prior to controlling standard control strategy) than a rate of acceleration from rest of the snowmobile 10 for corresponding changes in accelerator position when controlling the engine 26 according to the standard control strategy without previously controlling the engine 26 according to the launch control strategy. This is due, at least in part, to the spooling-up of the turbocharger 170 provided during control of the engine 26 according to the launch control strategy. In response to controlling the engine 26 according to the launch control strategy then the standard control strategy in the method 300, a speed of rotation of the turbocharger 170 increases. Specifically, the speed of rotation of the turbocharger 170 upon acceleration from rest is greater, when controlling the engine 26 according to the launch then standard control strategies, than the speed of rotation of the turbocharger 170 upon acceleration from rest when controlling the engine 26 according to the standard control strategy without previously controlling the engine 26 according to the launch control strategy.

At any point during operation of the method 300, subsequent to receiving the mode indication, the controller 150 could determine that one or more deactivation conditions have been met. As is described above, the launch control mode may need to be deactivated following detection of at least one deactivation condition for a variety of reasons. One non-limiting example of a deactivation condition is a time limit on operating the engine 26 at an increased engine speed, which is implemented at least in part to aid in avoiding overheating of the engine 26. In some cases, the controller 150 could return the snowmobile 10 and the engine 26 to a standard operation mode, at step 292, whereby the snowmobile 10 is operated according to the standard control strategy in response to at least one deactivation condition being met. If, during operation of the method 300, a time limit is exceeded after limiting the engine speed to about 3200 RPM at step 360, the controller 150 could also return, at step 294, the engine 26 to normal idle and removes any torque limiting parameters that may have been activated. In such a case, the method 300 would then progress to step 292 to return the snowmobile 10 to standard operation.

It is contemplated that the method 300 could include additional or different steps, either to perform additional functions and/or to perform the steps described above.

Figure 8:
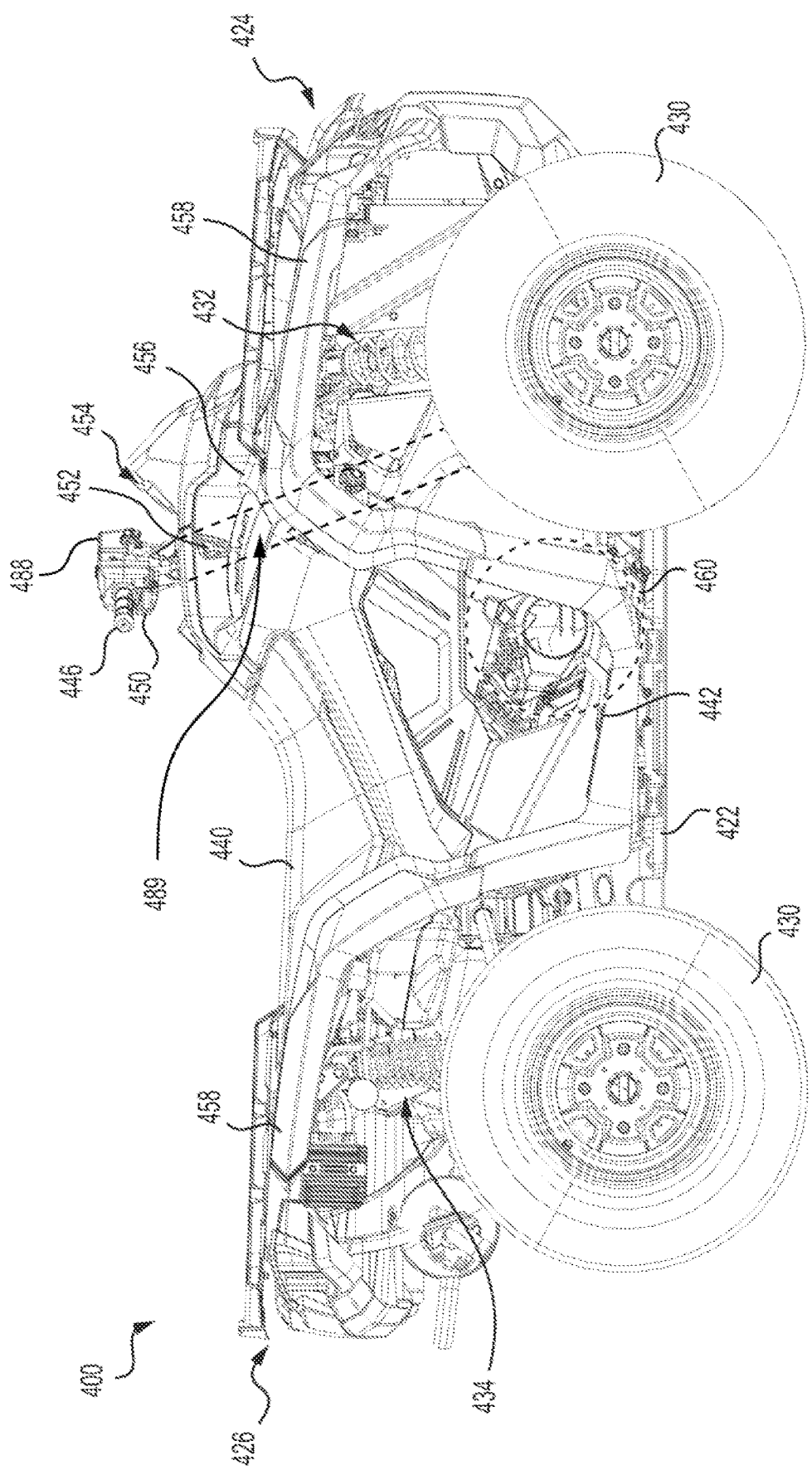
FIG. 8 is a right side elevation view of an all-terrain vehicle (ATV)
Figure 9:
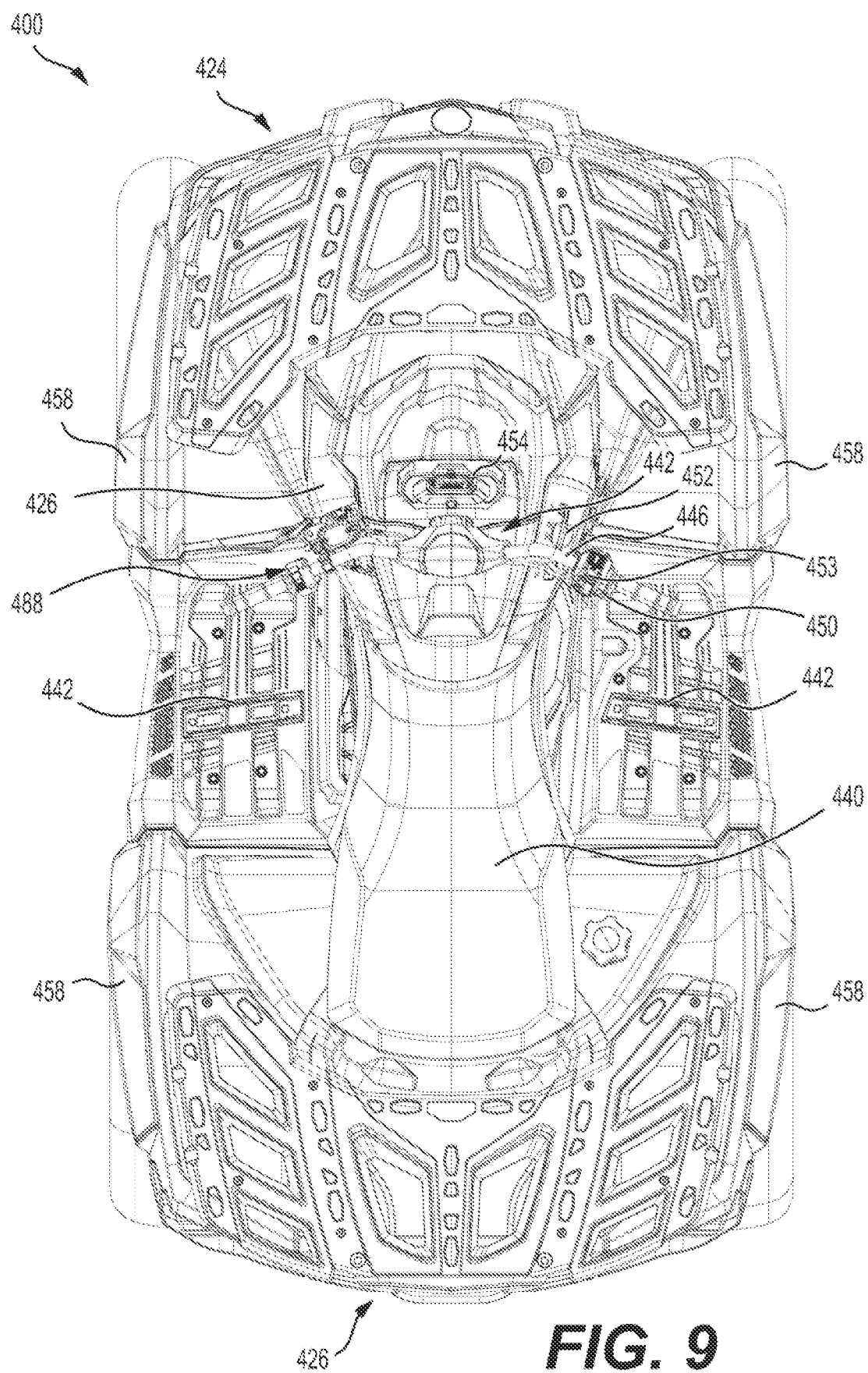
FIG. 9 is a top plan view of the ATV of FIG. 8.

The flowchart 200 and the method 300 could, in some non-limiting embodiments, be implemented by an all-terrain vehicle (ATV) 400, mutatis mutandis. The ATV 400 will be described briefly with reference to FIGS. 8 and 9.

The ATV 400 has a frame 422 having a front end 424 and a rear end 426 defined consistently with a forward travel direction of the ATV 400. The ATV 400 has two front wheels 430 and two rear wheels 430. Each of the four wheels 430 is provided with low-pressure balloon tires adapted for off-road conditions and traversing rugged terrain. It is contemplated that the ATV 400 could have six wheels 430 or only three wheels 430.

The two front wheels 430 are suspended from the frame 422 by left and right front suspension assemblies 432 while the two rear wheels 430 are suspended from the frame 422 by left and right rear suspension assemblies 434. The ATV 400 further includes a straddle seat 440 connected to the frame 422 for accommodating a driver of the ATV 400.

An internal combustion engine 460 (schematically illustrated in FIG. 8) is connected to the frame 422 for powering the ATV 400. The engine 460 is disposed under the straddle seat 440. The wheels 430 are operatively connected to the engine 460. Driver footrests 442 are provided on either side of the straddle seat 440 and are disposed vertically lower than the straddle seat 440 to support the driver's feet. The footrests 442 are connected to the frame 422. A steering assembly 444 is rotationally connected the frame 422 to enable a driver to steer the ATV 400. The steering assembly 444 includes a handlebar 446 connected to a steering column assembly (not shown) for actuating steering linkages (not shown) operatively connected to left and right front wheels 430.

An accelerator lever 450, also referred to as an accelerator 450 or a throttle operator 450, in the form of a thumb-actuated throttle lever, is mounted to the handlebar 446. Other types of throttle operators, such as a finger-actuated throttle lever and a twist grip, are also contemplated. A brake actuator 488, in the form of a hand brake lever 488, is provided on the left side of the handlebar 446 for controlling a braking system 489 of the ATV 400 (shown schematically in FIG. 8).

A gear shifter 452 located near the handlebar 446 operates a transmission assembly (not shown) and enables the driver to select one of a plurality of gear configurations for operation of the ATV 400. In the illustrated embodiment of the ATV 400, the gear configurations include park, neutral, reverse, low, and drive. It is contemplated that the sequence and/or number of gear configurations could be different than as shown herein. A driving mode selector button 453 also enables the driver to select 2×4, 4×4, or sport mode operation of the ATV 400, as well the launch control mode as described above with respect to the snowmobile 10. A display cluster 454, including a number of gauges and buttons, is disposed forwardly of the steering assembly 444.

The ATV 400 further includes a controller (not shown) configured to perform a number of operations including methods described above for accelerating the ATV 400 from rest using the launch control mode.

The controller of the ATV 400 is operatively and communicatively connected to various sensors and systems in order to perform the method 300 (mutatis mutandis) including, but not limited to, at least one of: an ECU connected to the engine 460, the brake lever 488, the accelerator lever 446, an intake air temperature sensor (not shown), the driving mode selector button 453, an engine speed sensor (not shown), and an engine temperature sensor (not shown). For the ATV 400, the controller is further communicatively connected to the gear shifter 452 (connected to a gear shifter sensor, for example) in order to determine that the ATV 400 is in a drive gear before enabling the launch control mode selection capability.

The ATV 400 further includes other components such as a radiator, headlights, and the like. As it is believed that these components would be readily recognized by one of ordinary skill in the art, further explanation and description of these components will not be provided herein.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for accelerating a vehicle from rest, the method comprising:
controlling, by a controller, an engine of the vehicle according to a first control strategy;
receiving, from a mode input by the controller, a mode indication indicating that an operator of the vehicle has selected a launch control mode for accelerating the vehicle;
in response to receiving at least the mode indication, controlling the engine, by the controller, according to a second control strategy;
while controlling the engine according to the second control strategy, determining, by the controller, an accelerator position of an accelerator of the vehicle;
in response to the accelerator position being greater than zero, controlling, by the controller, the engine to:
increase, according to the accelerator position, an opening of a throttle valve of the engine, and
control operational conditions of the engine to limit engine torque output;
while controlling the engine according to the second control strategy, receiving, by the controller, an indication to end control by the second control strategy; and in response to receiving the indication, controlling the engine, by the controller, according to the first control strategy,
controlling the engine according to the first control strategy in response to the indication causing the vehicle to accelerate from rest,
a first rate of acceleration from rest of the vehicle being greater than a second rate of acceleration from rest of the vehicle for corresponding changes in accelerator position,
the first rate of acceleration corresponding to the vehicle accelerating from rest after sequentially controlling the engine according to the first and second control strategies;
the second rate of acceleration corresponding to the vehicle accelerating from rest by controlling the engine according to the first control strategy without previously controlling the engine according to the second control strategy.

2. The method of claim 1, wherein, controlling the engine according to the second control strategy includes:
increasing a speed of the engine, and
limiting a torque output of the engine.

3. The method of claim 1, wherein controlling the engine according to the first control strategy comprises controlling a turbocharged engine of the vehicle according to standard operational parameters.

4. The method of claim 1, further comprising:
prior to receiving the mode indication, determining, by the controller, that each of a plurality of initial mode conditions have been met; and
in response to the plurality of initial mode conditions being met, enabling a mode input by the controller, the mode indication being sent to the controller from the mode input upon selection of the launch mode by the operator via the mode input.

5. The method of claim 1, further comprising, while controlling the engine according to the second control strategy:
determining, by the controller, that at least one deactivation condition has been met; and
in response to the at least one deactivation condition being met, returning to a standard operation mode whereby the vehicle is operated according to the first control strategy.

6. The method of claim 5, wherein determining that the at least one deactivation condition has been met includes determining that a time limit of controlling the engine according to the second control strategy has been reached.

7. The method of claim 1, wherein the indication to end control by the second control strategy includes a brake-off indication indicating that the braking system has been released.

8. The method of claim 1, wherein controlling operational conditions of the engine to limit engine torque output comprises at least one of:
delaying combustion ignition; and
deactivating at least one cylinder.

9. The method of claim 1, wherein in response to increasing the opening of the throttle valve according to the accelerator position, air flow increases through the engine.

10. The method of claim 1, wherein, in response to controlling the engine according to the first and second control strategies, a speed of rotation of a turbocharger of the vehicle increases.

11. The method of claim 1, wherein,
a first speed of rotation of a turbocharger of the vehicle upon acceleration from rest is greater than a second speed of rotation of the turbocharger upon acceleration from rest;
the first speed of rotation corresponds to the vehicle accelerating from rest after sequentially controlling the engine according to the first and second control strategies; and
the second speed of rotation corresponds to the vehicle accelerating from rest by controlling the engine according to the first control strategy without previously controlling the engine according to the second control strategy.

12. The method of claim 1, wherein, in response to receiving the mode indication and prior to controlling the engine according to the second strategy, controlling the engine to increase engine speed.

13. The method of claim 12, further comprising, subsequent to receiving the mode indication and prior to controlling the engine according to the first strategy subsequent to receiving the mode indication:
determining, by the controller, that at least one deactivation condition has been met; and
in response to the at least one deactivation condition being met, returning to a standard operation mode whereby the vehicle is operated according to the first control strategy.

14. The method of claim 13, wherein determining that the at least one deactivation condition has been met includes determining that a time limit of increased engine speed has been reached.

15. The method of claim 1, further comprising:
determining, by the controller, that a speed of the engine has surpassed a threshold engine speed; and
wherein the controller controls the engine according to the second control strategy in response to receiving the mode indication, and determining that the engine speed has surpassed a threshold engine speed.

16. A vehicle comprising:
a frame;
at least one seat connected to the frame;
an engine supported by the frame;
a turbocharger operatively connected to the engine;
a controller communicatively connected to the engine; and
an accelerator communicatively connected to the controller,
the controller being configured to perform the method of claim 1.

17. A vehicle comprising:
a frame;
at least two ground engaging members connected to the frame;
a braking system operatively connected to at least one of the at least two ground engaging members;
at least one seat connected to the frame;
an engine supported by the frame;
a turbocharger operatively connected to the engine;
a controller communicatively connected to the engine; and
an accelerator communicatively connected to the controller,
the controller being configured to perform the steps of:
controlling an engine of the vehicle according to a first control strategy;

receiving a mode indication indicating that an operator of the vehicle has selected a launch mode for accelerating the vehicle;

in response to receiving the mode indication, controlling the engine according to a second control strategy;

while controlling the engine according to the second control strategy, determining an accelerator position of an accelerator of the vehicle;

in response to the accelerator position being greater than zero, controlling the engine to:
increase, according to the accelerator position, an opening of a throttle valve of the engine, and
control operational conditions of the engine to limit engine torque output;

while controlling the engine according to the second control strategy, receiving an indication to end control by the second control strategy; and in response to receiving the indication, controlling the engine according to the first control strategy, controlling the engine according to the first control strategy with the braking system having been released causing the vehicle to accelerate from rest, a first rate of acceleration from rest of the vehicle being greater than a second rate of acceleration from rest of the vehicle for corresponding changes in accelerator position, the first rate of acceleration corresponding to the vehicle accelerating from rest after sequentially controlling the engine according to the first and second control strategies;

the second rate of acceleration corresponding to the vehicle accelerating from rest by controlling the engine according to the first control strategy without previously controlling the engine according to the second control strategy.

18. The vehicle of claim 17, further comprising:

a mode input communicatively connected to the controller; and wherein the controller is further configured to perform the steps of:
prior to receiving the mode indication, determining, by the controller, that each of a plurality of initial mode conditions have been met, and
in response to the plurality of initial mode conditions being met, enabling the mode input by the controller to allow the operator to select the launch mode.

19. The vehicle of claim 17, wherein:

the vehicle is a snowmobile;

the at least two ground engaging elements include:
two skis connected to the frame, and
an endless track disposed rearward of the two skis;

the at least one seat is at least one straddle-seat; and the accelerator is an accelerator lever.

20. The vehicle of claim 17, wherein:

the vehicle is an all-terrain vehicle (ATV);

the at least two ground engaging elements include at least two wheels;

the at least one seat is at least one straddle-seat; and the accelerator is an accelerator lever.

\* \* \* \* \*